United States Patent
Zurko et al.

(10) Patent No.: US 7,607,172 B2
(45) Date of Patent: Oct. 20, 2009

(54) METHOD OF PROTECTING A COMPUTING SYSTEM FROM HARMFUL ACTIVE CONTENT IN DOCUMENTS

(75) Inventors: Mary Ellen Zurko, Groton, MA (US); Veronica Morales, Cambridge, MA (US); Robert Congdon, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 10/790,944

(22) Filed: Mar. 2, 2004

(65) Prior Publication Data

US 2005/0198692 A1    Sep. 8, 2005

(51) Int. Cl.
*G06F 12/14* (2006.01)
*G08B 23/00* (2006.01)

(52) U.S. Cl. .......................... 726/24; 713/187; 713/188
(58) Field of Classification Search .................. 726/24; 713/187, 188
See application file for complete search history.

(56) References Cited

U.S. PATENT DOCUMENTS

| | | | |
|---|---|---|---|
| 5,832,208 A * | 11/1998 | Chen et al. | 713/188 |
| 6,092,194 A | 7/2000 | Touboul | |
| 6,240,530 B1 * | 5/2001 | Togawa | 726/24 |
| 6,675,174 B1 * | 1/2004 | Bolle et al. | 707/104.1 |
| 6,701,440 B1 * | 3/2004 | Kim et al. | 713/188 |
| 7,171,691 B2 * | 1/2007 | Baber et al. | 726/24 |
| 7,263,561 B1 * | 8/2007 | Green et al. | 726/24 |
| 2005/0198692 A1 * | 9/2005 | Zurko et al. | 726/24 |

* cited by examiner

*Primary Examiner*—Kambiz Zand
*Assistant Examiner*—William S Powers
(74) *Attorney, Agent, or Firm*—Guerin & Rodriguez, LLP; Michael A. Rodriguez

(57) ABSTRACT

Described are a system and method for protecting a computing device from potentially harmful code in a document. One or more definitions of potentially harmful active content are provided in an editable text file. The document is compared with each definition of potentially harmful active content in the editable text file to identify potentially harmful active content within the document. The document is modified to render harmless any identified potentially harmful active content before presenting the document to the computing device.

15 Claims, 4 Drawing Sheets

METHOD OF PROTECTING A COMPUTING SYSTEM FROM HARMFUL ACTIVE CONTENT IN DOCUMENTS

FIELD OF THE INVENTION

The invention relates generally to computer networks. More particularly, the invention relates to a system and method for protecting computer systems from harmful code embedded in downloaded documents.

BACKGROUND

Many Web pages today contain active content for enhancing the experience of a user who downloads and displays a Web page at a client computing device using client software, typically a browser. In general, active content is a program or code transparently embedded in a downloaded document (e.g., hypertext markup language (HTML) defining a Web page). The code automatically executes on the client computing device when the Web page is downloaded, causing a type of action to occur. Most Web pages provide active content by including Java™ scripts, Java™ applets, Visual Basic® scripts, or Active X® controls in the HTML.

Embedded within application level information, active content poses a security threat to the client computing device. For example, Java™ or JavaScript™ code placed within collaborative application data, such as mail messages, chat messages, and shared documents, can exploit vulnerabilities in the client software executing the code. These vulnerabilities include cross-site scripting (XSS) holes and gaps in the Java™ security model, which may assume that the host delivering the data vouches for it. By exploiting such vulnerabilities, an attacker can perform unauthorized operations, such as causing execution of malicious code, taking control of the user's session, and stealing information from the user's computing device.

Because of these undesirable activities, some applications disable scripting languages. Although this effectively protects the user, this technique disables desirable functionality. Some applications remove all active content from the dynamic HTML (DHTML) content. Although this technique effectively avoids execution of malicious code, it also withholds harmless, potentially useful code. Another technique blocks the download of a document within which harmful active content is detected. However, this technique unnecessarily blocks the user from receiving non-dangerous active content in those documents found to have potentially harmful code. Thus, there is a need for a system and method capable of detecting and removing harmful active content from a document without preventing the user from receiving the document and executing non-dangerous active content in that document.

SUMMARY

In one aspect, the invention features a method for protecting a computing device from potentially harmful code in a document. The method comprises receiving a data structure representation of the document. One or more definitions of potentially harmful active content are provided in an editable configuration file. Each definition identifies potentially harmful active content and specifies an action to be performed on that potentially harmful active content if that potentially harmful active content is found in the document. A user dynamically edits the editable configuration file by adding a new definition. The editable configuration file is parsed to generate a data structure representation of the definitions in the editable configuration file. The data structure representation of the document with the data structure representation of the definitions of potentially harmful active content to identify potentially harmful active content within the document. The document is modified to render harmless any identified potentially harmful active content before presenting the document to the computing device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a system and method for protecting a computing device from potentially harmful active content (i.e., programs or code) embedded in downloaded files or documents. Downloading as used herein means transferring a document, a file, or information from a remote computing device to a local computing device. Such downloading can occur over a local area network or over a wide area network, such as the Internet. If unfiltered, active content in a downloaded document may perform unwanted or unauthorized (generally referred to as harmful) actions on the local computing device, with or without the user knowing.

To protect the local computing device from such actions, the system and method of the present invention parse the contents of a document to syntactically identify items within the document that are considered harmful. These items can vary, not only syntactically (e.g., multiple tags), but also in terms of granularity (e.g., tags, attributes, or specific values within attributes and tags). A record of such items is kept within an editable configuration file. When new, potentially harmful items become known, an administrator or user can edit the configuration file to include these new items. Thus, the protection of the local computing device is able to keep pace with the development of new, potentially harmful active content. Except for those edits to the configuration file, changes to client-side or server-side software are not required to upgrade the filtering capability of the active content filter to respond to new forms of active content.

To simplify the identification process, the items listed in the configuration file can be expressed in the same language structure and schema of the document being examined for active content. When a document is determined to contain potentially harmful content, the document is altered (or transcoded) to make the document safe for presentation at the local computing device, leaving as much of the harmless content in the document as possible, while removing the harmful content.

Figure 1:
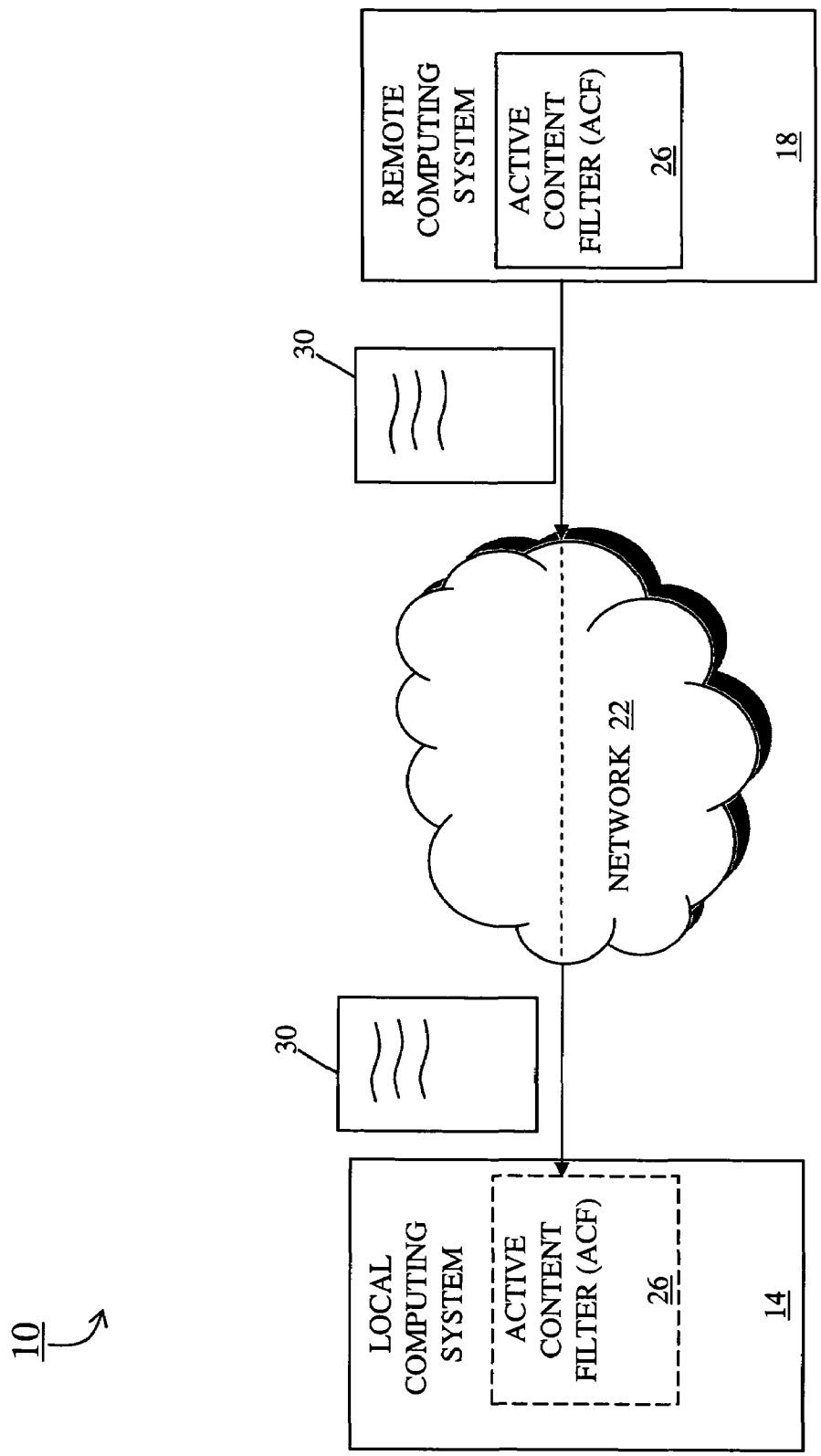
FIG. 1 is a block diagram of an embodiment of a networking system including an active content filter of the present invention.

FIG. 1 shows an embodiment of a network environment 10 in which active content is filtered in accordance with the principles of the invention. In addition to Web pages, active content can appear in a variety of other communications in the network environment 10, including email, chat messaging, applications, application development frameworks, collaborative frameworks, and collaborative applications. The network environment 10 includes a first computing system 14 and a second computing system 18 in communication with each other over a network 22. Example embodiments of the network 22 include, but are not limited to, the Internet, an intranet, a local area network (LAN), a wide area network (WAN), and a virtual private network (VPN). For purposes of illustrating the invention, the first computing system 14 is referred to as a local computing system and the second computing system 18 as a remote computing system. The first and second computing systems 14, 18 can also be referred to as client and server systems, respectively. The network 22 can have many other client and server systems than those shown.

In general, the local computing system 14 includes a processor-based device with a user interface, a display screen, an input device (e.g., keyboard, a mouse, trackball, touch-pad, touch-screen, etc), and persistent storage for storing data and software programs. Exemplary embodiments of the local computing system 14 include, but are not limited to, a personal computer, a Macintosh computer, a workstation, a hand-held device such as a personal digital assistant and a cellular phone, and a network terminal. One software program stored in the persistent storage is browser software, e.g., Microsoft Internet Explorer™. The browser software incorporates a Java™ virtual machine for interpreting Java™ code (i.e., applets, scripts) and applications. The operating system of the local computing system 14 can be one of a variety of platforms including, but not limited to, Windows 98, Windows NT 4.0, Windows XP, Palm OS®, Macintosh, UNIX®, Linux, and Windows CE for windows-based terminals. The local computing system 14 can also include a modem for communicating with an Internet service provider (ISP) on the network 22.

The remote computing system 18 is, in general, a Web application machine that includes memory for storing text files, graphics files, and executable scripts (e.g., JAVA applets) collectively stored and accessed as documents (e.g., Web pages). Example file formats for implementing such documents include, but are not limited to, the Hypertext Markup Language (HTML) and Extensible Markup Language (XML) documents. The remote computing system 18 also includes communications capabilities for receiving requests from the local computing system 14 to access a stored document and for transmitting information related to the accessed document to the local computing system 14 in reply. The remote computing system 18 can support a variety of operating system platforms, such as, for example, Windows 98, Windows 2000, Windows XP™, Windows NT, Macintosh, and UNIX. To communicate information across the network 22, in one embodiment, the computing systems 14, 18 use standard transport protocols, such as TCP/IP and the hypertext transfer protocol (HTTP).

The network environment 10 also includes an active content filter (ACF) 26 for examining a document 30 to be presented to the local computing system 14 and removing potentially harmful active content before the document 30 is displayed in the browser. The document 30 can be, for example, HTML in a mail message retrieved through the use of a WebMail application. WebMail applications enable users to read their electronic mail securely from a remote location using a Web browser. The ACF 26 can also be used to filter application content in other types of Web applications.

In one embodiment, the ACF 26 is part of the remote computing system 18 and operates to filter the active content before the document 30 is transported over the network 22 to the local computing system 14. Running the ACF 26 on the remote computing system 18 avoids needing to change local computing systems in order to practice the invention.

Although shown to be part of the remote computing system 18, the ACF 26 can instead be incorporated at the local computing system 14, as shown in phantom, e.g., in a Java 2, Enterprise Edition (J2EE) environment. In this embodiment, the remote computing system 18 transports the document 30 over the network 22 to the local computing system 14, and the ACF 26 at the local computing system 14 examines the document 30 before the document 30 is executed or displayed. Running the ACF 26 on the local computing system 14 permits the support of security features, such as signatures and encryption.

In another embodiment, the local and remote computing systems 14, 18 each include the ACF 26. In still another embodiment, the local computing system 14 implements a part of the ACF 26 and the remote computing system 18 a part of the ACF 26. Whether located at the local computing system 14, at the remote computing system 18, or at both, the ACF 26 is preferably always enabled (i.e., resident in memory an automatically executed whenever a document is to be filtered). In still yet another embodiment, a proxy machine between the remote computing system 18 and the local computing system 14 implements the ACF 26.

Figure 2:
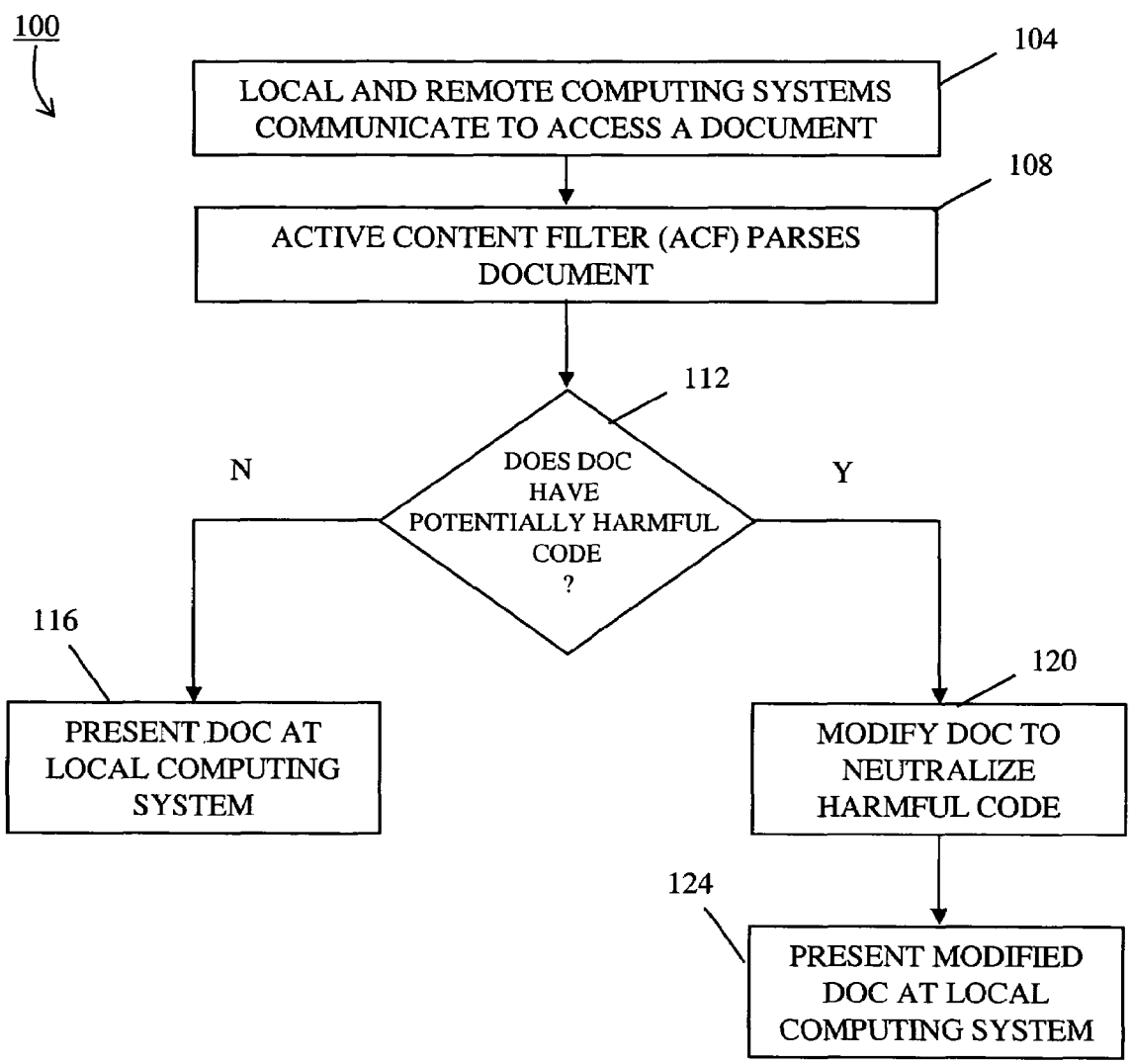
FIG. 2 is a flow diagram of an embodiment of a process for protecting a computing system from potentially harmful active content in a document.

In brief overview, FIG. 2 shows an embodiment of a process 100 for protecting the local computing system 14 from potentially harmful active content embedded in a document 30 downloaded from the remote computing system 18. In describing the process 100, reference is made to the networking environment 10 of FIG. 1. In step 104, the local computing system 14 communicates with the remote computing system 18 to access and download a document 30. For example, the document 30 can be an HTML Web page. Other examples of the document 30 include, but are not limited to, an email message, calendar invitations, Web conferences, and chat sessions. Before the document 30 is presented at the local computing system 14, the ACF 26 parses through (step 108) the document 30 to determine whether the document 30 contains potentially harmful active content. In one embodiment such processing occurs at the remote computing system 18, and in another embodiment at the local computing system 14.

During the parsing, the ACF 26 determines (step 112) whether the document contains potentially harmful active content by comparing the contents of the document 30 with known descriptions or definitions of potentially harmful active content. If the ACF 26 determines that the document 30 contains no active content or no active content that is considered potentially harmful, the document 30 is presented (step 116) unchanged to the local computing system 14. If the ACF 26 instead identifies potentially harmful active content in the document 30, the ACF 26 modifies (step 120) the document 30 to render that active content harmless (i.e., neutralize the active content). A modified document 30 is then presented (step 124) at the local computing system 14. As used herein, presenting the document, whether modified or unmodified, at a computing system means that the active content in that document, if any, is activated. Typically, such presentation means that the document or portions of the document are displayed at the computing system, but displaying is not necessary for the purposes of practicing the invention.

Figure 3:
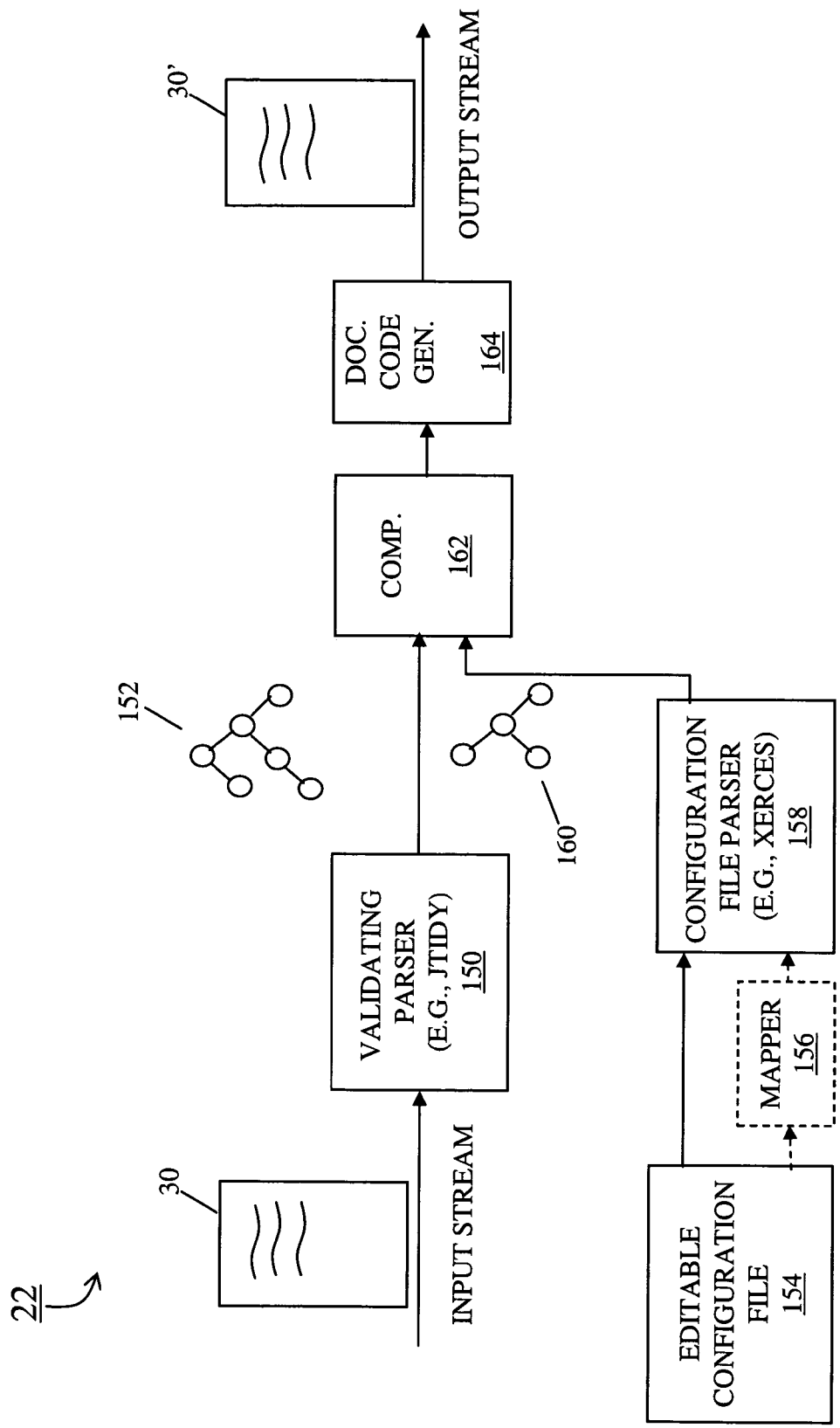
FIG. 3 is a block diagram of an embodiment of the active content filter of the invention.

FIG. 3 shows an embodiment of the ACF 26 of the present invention. The ACF 26 includes a validating parser 150, an editable (i.e., modifiable) configuration file 154, an optional mapper 156, a configuration parser 158, a comparator 162, and a document code generator 164. The validating parser 150 receives an input stream comprising the document 30. The validating parser 150 includes program code for parsing the document 30, for determining whether the document 30 is well-formed, for making repairs of malformed and faulty syntax, and for constructing a data-structure representation 152 of the document 30 (with any repairs). In one embodiment, the validating parser 150 uses the JTidy HTML library. In this embodiment, JTidy parses the HTML content, ensures the HTML is in valid form, and produces a corresponding Document Object Model (DOM) tree 152. The DOM tree 152 facilitates adding, deleting, modifying, and replacing individual tags and attributes.

The configuration file 154 is a text file that specifies those portions of a document that can contain active content. As a text file, an administrator is able to edit the text file using, for example, a text editor or word processing software. Adding or removing items from the configuration file 154 changes the filtering behavior of the ACF 26. Each item specified in the configured file 154 is hereafter referred to as an active content definition.

In one embodiment, the configuration file 154 is XML-based and identifies potentially harmful HTML tags and attributes. The following is an example of various active content definitions within an XML-based configuration file:

```
<acf-config>
    <attribute-filter attribute='on' action='remove-attribute' />
    <attribute-filter attribute='${' action='remove-attribute' />
    <attribute-filter attribute='href' value='javascript:'
    action='remove-attribute' />
    <attribute-filter attribute='src' value='javascript:'
    action='remove-attribute' />
    <attribute-filter attribute='dynsrc' value='javascript:'
    action='remove-attribute' />
    <tag-filter tag='applet' action='remove-tag' />
    <tag-filter tag='embed' action='remove-tag' />
    <tag-filter tag='object' action='remove-tag' />
    <tag-filter tag='textarea' action='remove-tag' />
    <tag-filter tag='script' action='remove-tag' />
    <tag-filter tag='iFrame' action='remove-tag'/>
    <tag-filter tag='link' attribute='rel' value='stylesheet'
    action='remove-tag' />
    <tag-filter tag='style' attribute='type' value='text/
    javascript' action='remove-tag' />
</acf-config>
```

As illustrated by this example, the configuration file 154 defines active content at various degrees of granularity. Active content to be filtered can be defined broadly at a tag level, more finely at an attribute level, and more finely still at a value level. Filtering can be based on other criteria not shown in the exemplary configuration file, such as based on signatures, user settings, and database settings.

For each active content definition, the configuration file 154 also specifies the action to be taken by the ACF 26 (e.g., to remove the tag or the attribute from the document). Other actions than those illustrated can be defined, such as to insert a comment or to provide active content known to be harmless. In one embodiment, the action taken depends upon whether the document includes a digital signature. Because the actual contents of the document are used to create the signature, any alteration to the document body can invalidate the signature. A backup copy of the original email can be maintained before the active content is filtered. The copy can be used to check the signature (without displaying the email). Also, in embodiments where the remote computing system or a proxy machine modifies the document, the modified document can be signed by a system key to attest to the trustworthiness of the modified document.

In a preferred embodiment, the active content definitions in the configuration file 154 are expressed in the same language and schema as the document 30 being processed. In another embodiment, the configuration file 154 employs a different language and schema to specify the active content definitions than that used in the document 30. In this embodiment a mapper 156 (shown in phantom) includes program code for translating the language and schema of the configuration file 154 into the language and schema of the document 30.

The configuration parser 158 includes program code for receiving as input the configuration file 154 and for constructing a corresponding data structure representation 160 of the active content definitions therein. To facilitate comparisons, this data structure representation 160 produced by the configuration file parser 158 is of the same type as the data structure representation 152 produced from the contents of the document 30 (e.g., here both data structures 152, 160 are DOM trees). One exemplary implementation of the configuration file parser 158 is a DOM-based Xerces Java, an open-source XML Parser sponsored by the Apache Software Foundation. Other parsers can be used, such as the Simple API for XML (SAX) or a heuristic parser that uses regular expressions, without departing from the principles of the invention.

The comparator 162 includes program code for comparing the data structure representations 152, 160 of the document 30 and of the configuration file 154, respectively, to find any matching nodes. Matches identify active content to be filtered out. The document code generator 164 includes program code for removing and replacing the identified active content with benign content, e.g., a comment, active content with known safe behavior. The document code generator 164 provides an output stream representing the document 30' to be presented at the local computing system 14 (here, the prime (') designation indicates that the original document 30 may have been modified, by the validating parser 154, by the document code generator 164, or by both).

With the exemplary configuration file 154 described above, the ACF 26 filters out the following examples of active content:

```
<script>alert("hello world")</script>;
<link rel="StyleSheet" href=" http://i.site.net/ virtual/2001/style/main.css" type="text/css">;
<a href=" javascript:LaunchVideo('/world/2002/06/24/speech.','300k');">Video</A>;
<textarea name=idtype onmouseout="this.value=""></textarea>;
<embed name="realmedia" src="thunder.ram" height=100 width=200> </embed>;
<object data="thunder.mpeg" type="application/mpeg"> </object>; and
<applet code="Ticker.class" NAME="Ticker" width=400 height=100> <param name=symbols value="IBM, INTC"> </applet>.
```

Figure 4:
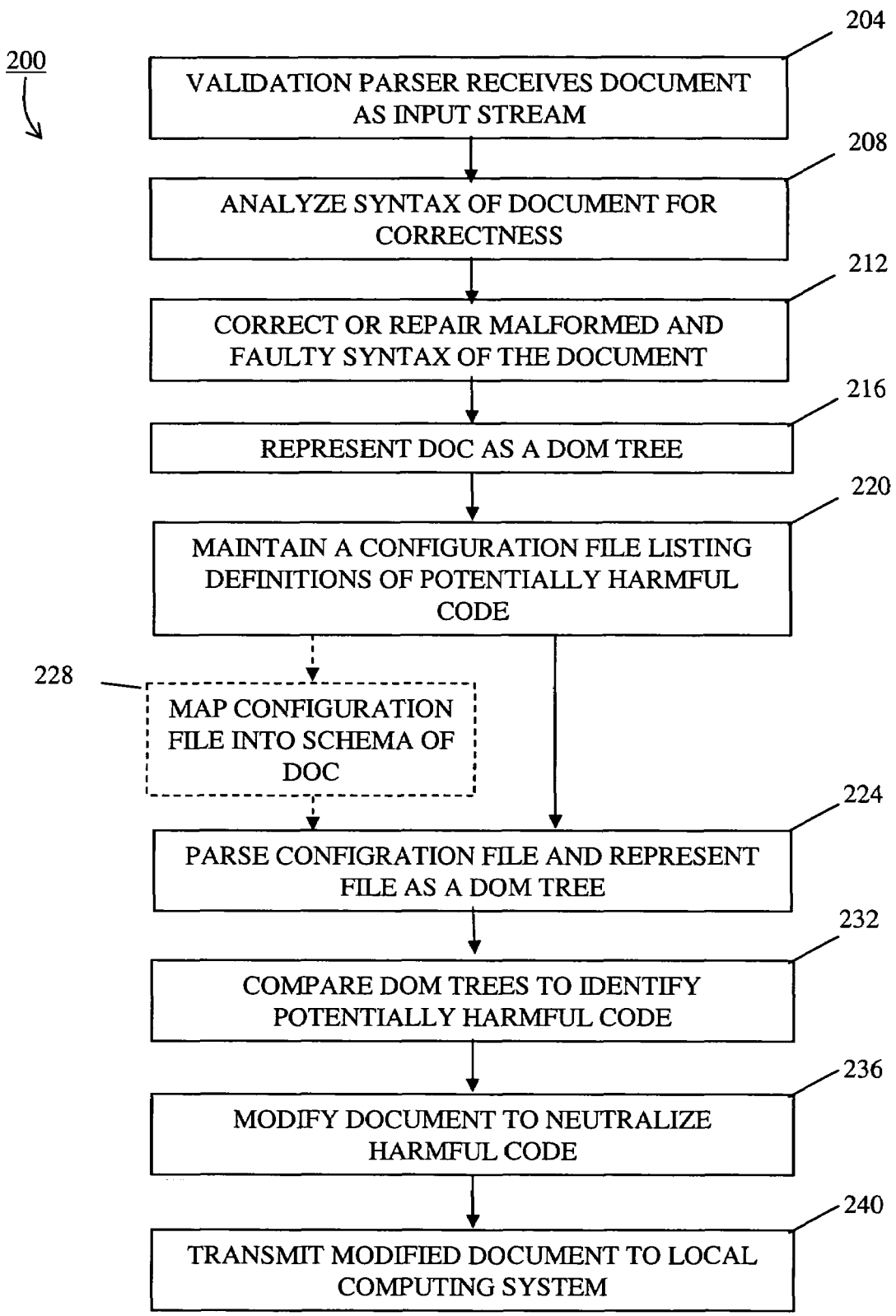
FIG. 4 is a flow diagram of an embodiment of a process for determining whether a document contains potentially harmful or malicious active content.

FIG. 4 shows an embodiment of a process 200 for determining whether a document contains potentially harmful active content and for neutralizing any such active content before the document is presented at the local computing system. In the description of the process 200, reference is also made to the ACF 26 of FIG. 3. It is not intended that the process 200 be limited to the particular order in which its steps are described; the principles of the invention can be practiced in a different order.

At step 204, the validating parser 150 receives an input stream corresponding to the document 30 from the remote computing system 18. The input stream is a byte stream in an appropriate character set, such as is usually found as part of the Content-Type header in a Multipurpose Internet Mail Extensions (MIME) message or MIME part. As used herein, the term "character set" refers to a process of using one or more tables to convert a sequence of octets into a sequence of characters.

The validating parser 150 parses the document 30 and verifies (step 208) the correctness of the syntax of the document 30 (based on the type of document, e.g., HTML). A known malicious technique is to embed malicious active content in malformed documents because some browsers automatically attempt to execute malformed documents. At step 212, corrections to or repairs of malformed and faulty syntax within the document 30 occur to put the document 30 in valid form. By examining and correcting the syntax of the document 30, the validating parser 150 can uncover potentially harmful active content. At step 216, the validating parser 150 produces a DOM tree 152 representation of the document 30.

At step 220, a set of definitions of potentially harmful active content is maintained in the configuration file 154. Such a set of definitions can be dynamically maintained; that is, the set of definitions can be modified at any time to alter the filtering characteristics of the ACF 26 without having to alter the application using the ACF 26. At step 224, the configuration file parser 158 analyzes the contents of the configuration file 154 and produces a DOM tree representation 160. In one embodiment, the mapper 156 first translates (step 228) the contents of the configuration file 154 into the language and schema of the document 30.

At step 232 the comparator 162 compares the DOM trees 152, 160 to find any matching nodes. The effect of comparing the DOM trees 152, 160 is to compare each active content definition in the configuration file 154 with the content of the document 30. Each match represents potentially harmful active content. The document code generator 164 modifies (step 236) any identified active content to render it harmless and produces an output stream representing a filtered (i.e., modified) document 30' that can be presented to the local computing system 14 for execution and display. The filtered output stream is also in an appropriate character set. If the filtering occurs at the remote computing system 18, the modified document 30' is transmitted (step 240) to the local computing system 14 over the network 22 for presentation.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method for protecting a computing device from potentially harmful code in a document, the method comprising:
   receiving a data structure representation of the document;
   providing one or more definitions of potentially harmful active content in an editable configuration file, each definition identifying potentially harmful active content and specifying an action to be performed on that potentially harmful active content if that potentially harmful active content is found in the document;
   dynamically editing by a user the editable configuration file by adding a new definition
   parsing the editable configuration file to generate a data structure representation of the definitions in the editable configuration file;
   comparing the data structure representation of the document with the data structure representation of the definitions of potentially harmful active content to identify potentially harmful active content within the document; and
   modifying the document to render harmless any identified potentially harmful active content before presenting the document to the computing device.

2. The method of claim 1, further comprising syntactically examining the document and placing the document in a valid form before comparing the document with each definition.

3. The method of claim 1, further comprising transmitting the modified document to the computing device over a network after the potentially harmful active content is rendered harmless.

4. The method of claim 3, wherein each definition is listed in the configuration file in a same language structure and schema as the document.

5. The method of claim 3, further comprising mapping each definition in the configuration file into a same language and schema as the document.

6. The method of claim 1, wherein the data structure representation of the document is a first document object model (DOM) tree and wherein the data structure representation of the definitions in the configuration file is a second DOM tree.

7. The method of claim 1, wherein the editable configuration file is an XML (extensible markup language) file.

8. The method of claim 1, wherein one or more of the definitions of potentially harmful active content identifies potentially harmful active content at a level of a tag in the document.

9. The method of claim 1, wherein one or more of the definitions of potentially harmful active content identifies potentially harmful active content at a level of an attribute in the document.

10. The method of claim 1, wherein one or more of the definitions of potentially harmful active content identifies potentially harmful active content at a level of an attribute value in the document.

11. The method of claim 1, wherein each definition is listed in the configuration file in a different language structure and different schema from the document.

12. The method of claim 1, wherein the action specified by a given definition is to remove an attribute from the document.

13. The method of claim 1, wherein the action specified by a given definition is to replace the identified potentially harmful active content in the document with active content known to be harmless.

14. The method of claim 1, wherein the action specified by a given definition is to remove a tag from the document.

15. The method of claim 1, further comprising identifying potentially harmful active content by finding a node in the data structure representation of the definitions that matches a node in the data structure representation of the document.

* * * * *

UNITED STATES PATENT AND TRADEMARK OFFICE
CERTIFICATE OF CORRECTION

PATENT NO. : 7,607,172 B2  Page 1 of 1
APPLICATION NO. : 10/790944
DATED : October 20, 2009
INVENTOR(S) : Zurko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1321 days.

Signed and Sealed this

Fourteenth Day of December, 2010

David J. Kappos
*Director of the United States Patent and Trademark Office*